(12) United States Patent
Choe et al.

(10) Patent No.: US 6,546,234 B2
(45) Date of Patent: Apr. 8, 2003

(54) APPARATUS AND METHOD FOR COMPENSATING RECEIVED SIGNAL STRENGTH INDICATOR ACCORDING TO TEMPERATURE

(75) Inventors: Chin-Sob Choe, Seoul (KR); Kyung-Min Lee, Seoul (KR)

(73) Assignee: Samsung Electronics Co, Ltd., Suwon (KR)

( * ) Notice: Subject to any disclaimer, the term of this patent is extended or adjusted under 35 U.S.C. 154(b) by 0 days.

(21) Appl. No.: 09/737,372

(22) Filed: Dec. 15, 2000

(65) Prior Publication Data

US 2001/0004586 A1 Jun. 21, 2001

(30) Foreign Application Priority Data

Dec. 20, 1999 (KR) .............................. 99-59246

(51) Int. Cl.[7] .............................................. H04B 17/00
(52) U.S. Cl. ................. 455/226.2; 455/226.4; 455/67.1; 455/126
(58) Field of Search ................ 455/249.1, 226.2, 455/226.4, 226.1, 214, 230, 263, 273, 311, 313, 127, 126, 552, 255, 67.1, 76, 245.1

(56) References Cited

U.S. PATENT DOCUMENTS

| | | | | | |
|---|---|---|---|---|---|
| 4,578,820 | A | * | 3/1986 | Highton | 455/226.2 |
| 5,790,943 | A | * | 8/1998 | Fotowat-Ahmady | 455/226.2 |
| 5,875,388 | A | * | 2/1999 | Daughtry, Jr. et al. | 455/67.1 |
| 5,912,922 | A | * | 6/1999 | Koszarsky | 375/224 |
| 6,104,919 | A | * | 8/2000 | Lyall, Jr. | 455/249.1 |
| 6,115,587 | A | * | 9/2000 | Kim et al. | 455/126 |
| 6,215,990 | B1 | * | 4/2001 | Kidd et al. | 455/255 |
| 6,269,251 | B1 | * | 7/2001 | Kim et al. | 455/522 |

* cited by examiner

Primary Examiner—Vivian Chin
Assistant Examiner—John J Lee
(74) Attorney, Agent, or Firm—Steve Cha; Cha & Reiter

(57) ABSTRACT

An apparatus for compensating a received signal strength (RSSI) according to temperature. An average power detector detects average power of a received signal. An RSSI compensation value detector detects an internal temperature of the RSSI compensation apparatus and detects an RSSI compensation value according to the detected temperature. An RSSI detector detects an RSSI by adding the average power to the RSSI compensation value.

9 Claims, 4 Drawing Sheets

| TEMPERATURE | TEMPERATURE DATA |
|---|---|
| −10°C | 0000111100 |
| −9°C | 0000111111 |
| ... | ... |
| 0°C | 1000000000 |
| ... | ... |
| 25°C | 1110000000 |
| ... | ... |
| 55°C | 1111111110 |

APPARATUS AND METHOD FOR COMPENSATING RECEIVED SIGNAL STRENGTH INDICATOR ACCORDING TO TEMPERATURE

CLAIM OF PRIORITY

This application makes reference to and claims all benefits accruing under 35 U.S.C. Section 119 from an application entitled "APPARATUS AND METHOD FOR COMPENSATING RECEIVED SIGNAL STRENGTH INDICATOR ACCORDING TO TEMPERATURE" filed in the Korean Industrial Property Office on Dec. 20, 1999 and there duly assigned Serial No. 99-59246.

BACKGROUND OF THE INVENTION

1. Field of the Invention

The present invention relates generally to an intermediate circular orbit satellite communication terminal, and in particular, to an apparatus and method for adjusting setting of the received signal strength indicator according to temperature changes in the terminal.

2. Description of the Related Art

Generally, a satellite communication terminal is serviced through a low earth orbit satellite. In most cases, however, such a communication terminal is typically used in a poor whether condition when compared with other normal radio terminals. Therefore, it is important for the satellite communication terminal to accurately measure the power level RSSI (received signal strength indication) of the received signals. This is because, for mode switching of the satellite communication terminal, the RSSI is transmitted to a satellite repeater through the low earth orbit satellite such so the satellite repeater controls the transmission power of a forward link. The RSSI is also used to estimate a timing offset by profiling the transmission power during the initial sync acquisition operation. Therefore, the RSSI detected by the satellite communication terminal affects the overall communication system.

Now, with reference to FIG. 1, a description will be made of a procedure for detecting the RSSI in the satellite communication terminal.

FIG. 1 illustrates the structure of an RSSI detector according to the prior art. Referring to FIG. 1, when a signal is received at the satellite communication terminal, the received signal is applied to an analog-to-digital (A/D) converter 111 after going through a normal demodulation process which includes a successive processing of low-noise amplification (LNA), filteration, and amplification.

The A/D converter 111 converts an input analog signal to a digital signal. A filter 113 filters the digital signal output from the A/D converter 111, and an average power detector 115 detects an average power of the filtered signal output from the filter 113. A dBm converter 117 then converts the average power detected by the average power detector 115 to a dBm value, and provides the converted dBm value to an RSSI mapper 119. Upon receiving the dBm value output from the dBm converter 117, the RSSI mapper 119 detects an RSSI matching the outputted dBm value and provides the detected RSSI to a subsequent demodulation stage.

In the above RSSI detection process, the received signal will be affected by the internal temperature and/or ambient temperature of the satellite communication terminal as the received signal travels through a low noise amplifier (LNA), a filter, and an amplifier. This is because the LNA, the filter and the amplifier components are very susceptible to the temperature. To solve this problem, it is necessary to use components that are not affected by the temperature. However, the implementation of such components will increase the manufacturing cost. Moreover, even when such components are used, it will be difficult to detect an accurate RSSI value.

SUMMARY OF THE INVENTION

It is, therefore, an object of the present invention to provide an apparatus and method for adjusting setting of the received signal strength indicator (RSSI) according to a temperature variation.

To achieve the above and other objects, there is provided an apparatus for compensating a received signal strength (RSSI) according to temperature variation. The average power detector detects the average power of a received signal. An RSSI compensation value detector detects the internal temperature of the RSSI compensation apparatus and obtains an appropriate RSSI compensation value according to the detected temperature. To this end, the RSSI detector detects an RSSI by adding the average power value to the RSSI compensation value.

BRIEF DESCRIPTION OF THE DRAWINGS

The above and other objects, features, and advantages of the present invention will become more apparent from the following detailed description when taken in conjunction with the accompanying drawings in which:

FIG. 4 is a temperature table according to the embodiment of the present invention.

DETAILED DESCRIPTION OF THE PREFERRED EMBODIMENT

A preferred embodiment of the present invention will be described herein below with reference to the accompanying drawings. For the purpose of clarity, well-known functions or constructions are not described in detail as they would obscure the invention in unnecessary detail.

Figure 1:
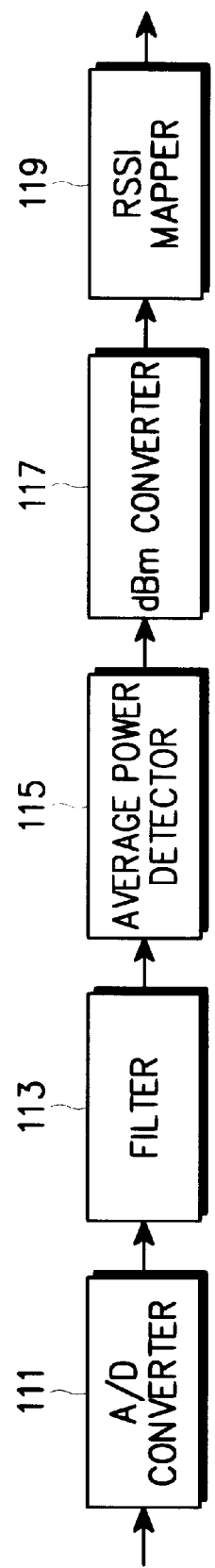
FIG. 1 is a block diagram illustrating a structure of an RSSI detector according to the prior art.
Figure 2:
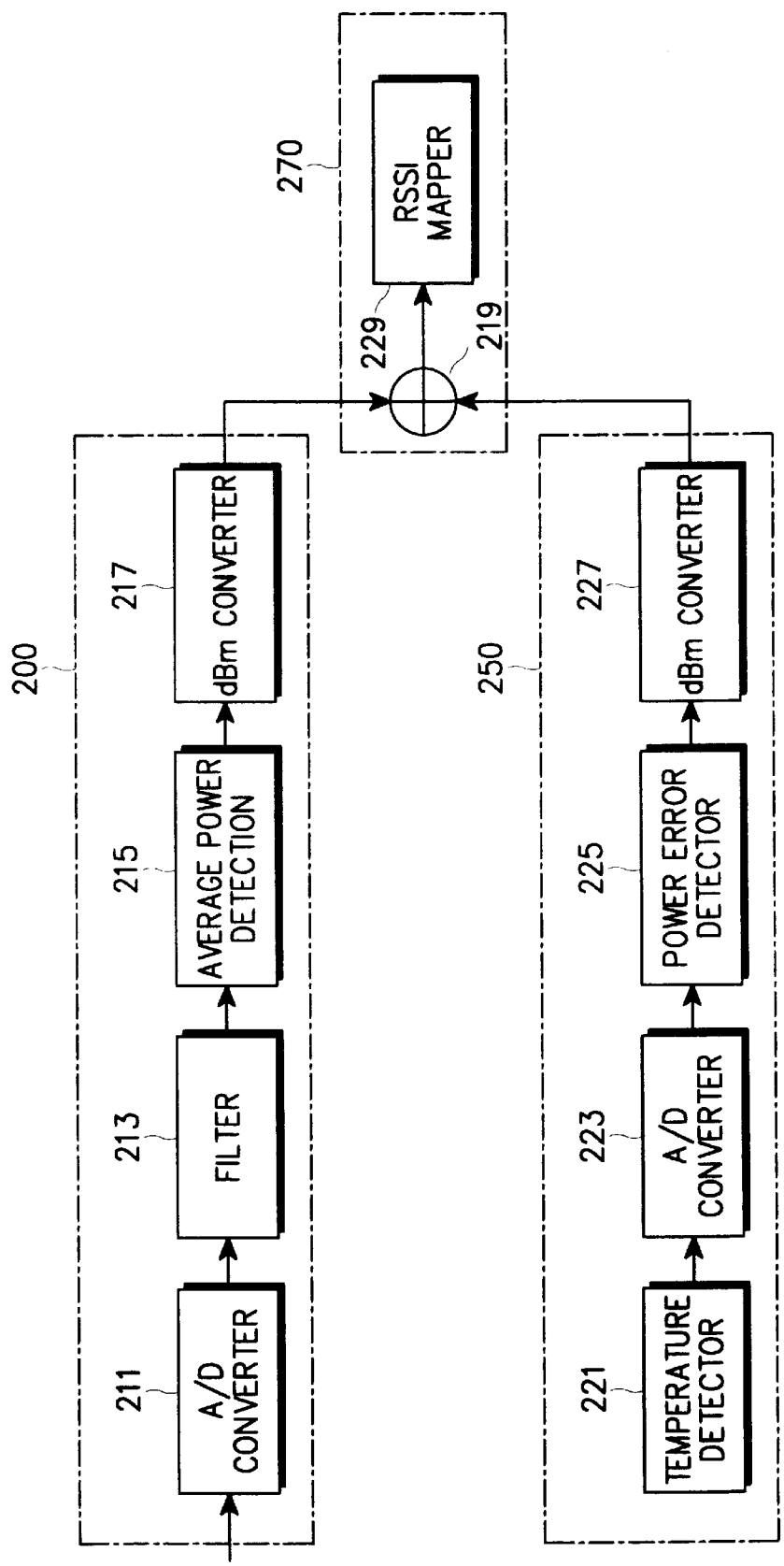
FIG. 2 is a block diagram illustrating the apparatus for compensating the RSSI value based on a temperature variation according to an embodiment of the present invention.

FIG. 2 illustrates an apparatus for compensating an RSSI depending on a variation of temperature according to an embodiment of the present invention. Referring to FIG. 2, the RSSI compensation apparatus includes an average power detector 200 for detecting the average power of a received signal; an RSSI compensation value detector 250 for detecting the internal temperature of the RSSI compensation apparatus and obtaining an RSSI compensation value according to the detected temperature; and, an RSSI detector 270 for generating the adjusted RSSI by adding the average power value to the RSSI compensation value.

The average power detector 200 includes an A/D converter 211, a filter 213, an average power detecting unit 215, and a dBm converter 217. The RSSI compensation value detector 250 includes a temperature detector 221, an A/D converter 223, a power error detector 225, and a dBm converter 227. The RSSI detector 270 includes an adder 219 and an RSSI mapper 229.

Operation begins when an analog signal input to the RSSI compensation apparatus is applied to the A/D converter 211, which converts where the analog input signal to a corresponding a digital signal. The converted digital signal is filtered by the filter 213 and then applied to the average power detecting unit 215. The average power detecting unit 215 detects the average power of the digital signal received therein and forwards the detected average power to the dBm converter 217. The dBm converter 217 converts the detected average power to a dBm value and forwards the converted dBm value to the adder 219.

Meanwhile, the temperature detector 221 detects the internal temperature of the RSSI compensation apparatus and generates a voltage value corresponding to the detected temperature. The A/D converter 223 converts the temperature-associated voltage value provided from the temperature detector 221 to a digital signal. The power error detector 225 searches a predetermined compensation table for the converted digital signal outputted from the A/D converter 223 to detect the corresponding power error. The procedure for detecting the power error by searching the compensation table will be described later with reference to FIG. 3.

The power error detected by the power error detector 225 is forwarded to the dBm converter 227. The dBm converter 227 then performs dBm conversion on the power error outputted from the power error detector 225 and forwards the converted power error to the adder 219. The adder 219 adds the dBm value outputted from the dBm converter 217 to the dBm value outputted from the dBm converter 227, and forwards the resulting output to the RSSI mapper 229. The RSSI mapper 229 then maps the added dBm value output from the adder 219 to a preset RSSI.

Figure 3:
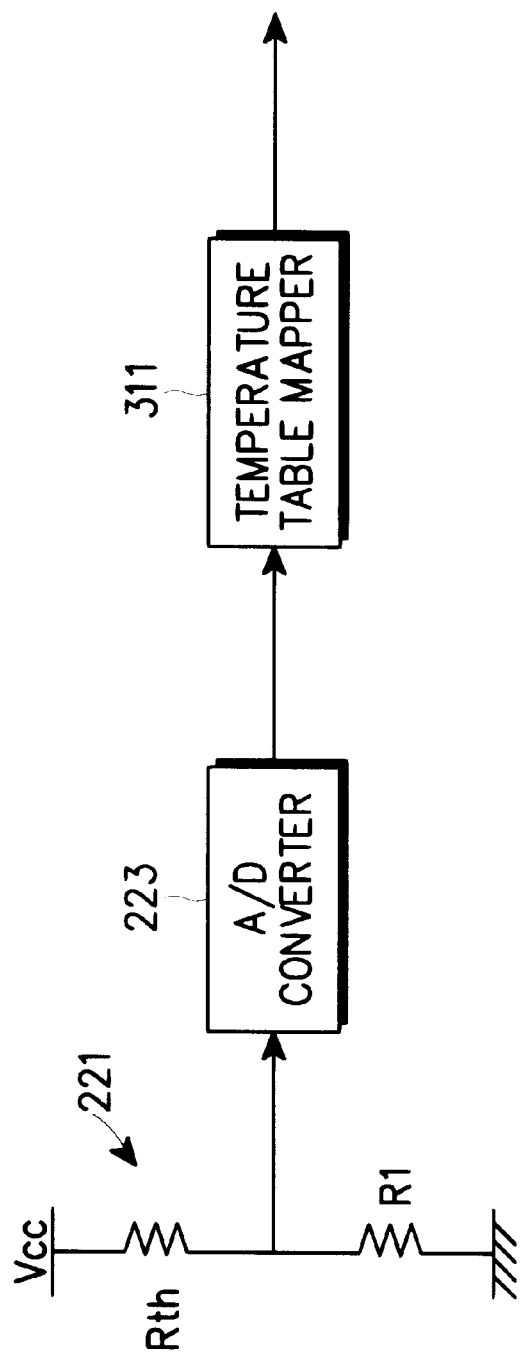
FIG. 3 is a block diagram illustrating a device for detecting an RSSI compensation value according to temperature, as shown in FIG. 2.

FIG. 3 illustrates a detailed structure of the RSSI compensation value detector 250 of FIG. 2, and FIG. 4 illustrates a temperature, by way of example, table according to embodiment of the present invention.

Referring to FIGS. 3 and 4, the temperature detector 221 is comprised of a thermistor Rth whose one end is connected to a power supply voltage Vcc, and a normal resistor R1 connected between the other end of the thermistor Rth and the ground. A voltage drop on a junction between the thermistor Rth and the resistor R1 is applied to the A/D converter 223. The A/D converter 223 converts the voltage output from the temperature detector 221 to a digital signal, and forwards the converted digital signal to a temperature table mapper 311. The temperature table, as shown in FIG. 4, is included in the power error detector 225 of FIG. 2.

With reference to FIG. 4, by way of example. In FIG. 4, if a digital signal output from the A/D converter 223 is "1111000000", it means that the detected temperature 25° C. FIG. 4 depicts an exemplary temperature table and shows the temperature set in the receiver of the satellite communication terminal that ranges from −10° C. to +55° C. Hence, and the voltage values output from the temperature detector 221 are mapped to the corresponding digital values.

Upon receiving the digital signal output from the A/D converter 223, the temperature table mapper 311 detects a temperature corresponding to the received digital data, and searches a predetermined compensation table for detecting a power error matching to the detected temperature.

In the compensation table, the power error values are stored in digital values that associate different temperatures ranges. The detected temperature-associated power error value is forward to the dBm converter 227 and used to adjust the level of compensate the RSSI according to the temperature, variation in the terminal.

For example, if the internal temperature of the satellite communication terminal is below the lower limit temperature, i.e., below −10° C., an amplification factor of the receiver will increase, so that the average power of the received signal becomes higher than its original power. Hence, by adjusting the power error according to the temperature variation according to the present invention, it is possible to output a more accurate RSSI value.

As described above, the present invention adjusts the level of the RSSI by detecting the power error responsive to a variation in the internal temperature of the satellite communication terminal, thereby making it possible to accurately detect the RSSI. As consequence, it is possible to accurately demodulate the received data compared to the prior art. Furthermore, the receiver is equipped with in the present invention, thus reducing the manufacturing cost.

While the invention has been shown and described with reference to a certain preferred embodiment thereof, it will be understood by those skilled in the art that various changes in form and details may be made therein without departing from the spirit and the scope of the invention as defined by the appended claims.

What is claimed is:

1. An apparatus for adjusting the level of a received signal strength (RSSI) according to temperature variation in a communication terminal, comprising:

an average power detector for detecting an average power of a received signal;

an RSSI compensation value detector for detecting an internal temperature of the communication terminal and for detecting an RSSI compensation value according to a predetermined table in which the detected RSSI compensation value is mapped according to the detected internal temperature; and an RSSI detector for detecting an RSSI by adding the average power to the RSSI compensation value.

2. The apparatus as claimed in claim 1, wherein the average power detector comprises:

an analog-to-digital (A/D) converter for converting an analog input signal to a digital signal;

a filter for filtering a signal output from the A/D converter;

an average power detecting unit for detecting average power of the filtered signal; and a dBm converter for converting the detected average power to a dBm value.

3. The apparatus as claimed in claim 1, wherein the RSSI compensation value detector comprises:

a temperature detector for detecting a voltage corresponding to the internal temperature of the RSSI compensation apparatus;

an A/D converter for converting the detected voltage to a digital signal;

a power error detector for detecting a power error corresponding to the converted digital signal; and a dBm converter for converting the detected power error to a dBm value.

4. The apparatus as claimed in claim 3, wherein the temperature detector comprises a thermistor.

5. The apparatus as claimed in claim 1, wherein the RSSI detector comprises:

an adder for adding the average power to the RSSI compensation value; and an RSSI mapper for mapping the RSSI corresponding to the added value.

6. A method for compensating an RSSI according to temperature, the method comprising the steps of:
　detecting average power of a received signal;
　detecting an internal temperature of an RSSI compensation apparatus and detecting an RSSI compensation value according to a predetermined table in which the detected RSSI compensation value is mapped according to the detected internal temperature; and
　detecting an RSSI by adding the average power to the RSSI compensation value.

7. The method as claimed in claim 6, wherein the average power detecting step comprises the steps of:
　converting an analog input signal to a digital signal;
　filtering the converted digital signal to detect average power; and
　converting the detected average power to a dBm value.

8. The method as claimed in claim 6, wherein the RSSI compensation value detecting step comprises the steps of:
　detecting a voltage corresponding to the internal temperature of the RSSI compensation apparatus;
　converting the detected voltage to a digital signal;
　detecting a power error corresponding to the converted digital signal; and
　converting the detected power error to a dBm value.

9. The method as claimed in claim 6, wherein the RSSI detecting step comprises the steps of:
　adding the average power to the RSSI compensation value; and
　mapping the RSSI corresponding to the added value.

* * * * *